Oct. 7, 1952

C. N. CONE 2,613,167

METHYL CELLULOSE-MODIFIED PHENOLIC
ADHESIVE AND PLYWOOD PRODUCT

Filed March 28, 1949

AQUEOUS ALKALINE SOLUTION OF A THERMOSETTING
PHENOL-ALDEHYDE RESIN, e.g. A PHENOL-FORMALDEHYDE RESIN
(200 parts by weight solids basis)

|

ADD SOLID FILLER, e.g. WALNUT SHELL FLOUR AND CLAY
(20-200 parts by weight)

|

MIX

|

ADD A WATER DISPERSIBLE CELLULOSE ETHER, e.g. 10-4000 cp.
METHYL CELLULOSE AS AN AQUEOUS DISPERSION CONTAINING
0.5 - 4.0 % BY WEIGHT METHYL CELLULOSE
(0.1 to 10.0 parts by weight solids basis)

|

MIX

|

ADD ALKALI METAL HYDROXIDE
( Solubilizing and dispersing quantity for
the resin, cellulose ether and filler )

|

FIG. I.        BLEND

↓

GLUE MIXTURE

|

SPREAD ON WOOD VENEERS AND HOT PRESS

↓

GLUED PLYWOOD

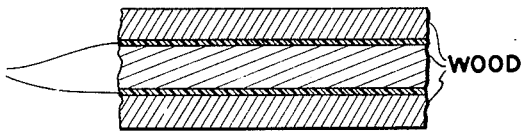

METHYL CELLULOSE MODIFIED
PHENOL ALDEHYDE RESIN GLUE        WOOD

FIG. 2.

INVENTOR.

Charles N. Cone

BY *Eugene D. Farley*

Atty.

Patented Oct. 7, 1952

2,613,167

UNITED STATES PATENT OFFICE 2,613,167

METHYL CELLULOSE-MODIFIED PHENOLIC ADHESIVE AND PLYWOOD PRODUCT

Charles N. Cone, Portland, Oreg., assignor to United States Plywood Corporation, New York, N. Y., a corporation of New York Application March 28, 1949, Serial No. 83,998

31 Claims. (Cl. 154—45.9)

The present invention relates to thermosetting, resinous adhesive compositions for use particularly in the manufacture of plywood by hot press methods. More specifically, the present invention relates to hot press plywood adhesives characterized by high tolerance to long assembly times and by other advantageous properties, which adhesives comprise phenol-aldehyde resinous condensation products modified with an alkali-dispersible cellulose ether, particularly methyl cellulose.

There are many factors determining the successful application of a given thermosetting adhesive composition to the manufacture of plywood. Among the principal ones are:

1. *High tolerance to long assembly times.*—In commercial plywood operations, it is usual practice to assemble from 16 to 20 panels, and then to load them into the press. Since the panel assembling operation is time consuming, the adhesive must have a character such that, during the assembly period, it does not migrate away from the glue line, become excessively advanced, or otherwise be affected in such a manner as to prevent the formation of a strong bond between the plies during pressing.

2. *High transfer, by which is meant the ability to flow upon pressing from the core veneer to which the adhesive is applied over to the adjacent surfaces of the face veneers and to wet the latter.*—Obviously, failure of the adhesive to transfer effectively results in the formation of a weak bond. The transfer qualities of the adhesive and its tolerance to long assembly times thus are closely interdependent factors since, in cases where an adhesive has a poor assembly time tolerance, this may be evidenced by its failure to transfer properly to the face veneers. Conversely, when an adhesive has high tolerance to long assembly periods, its transfer qualities are correspondingly good.

3. *Rapid setting.*—Since the output of a plywood mill is determined principally by the capacity of its presses, any reduction in the press time will increase the amount of plywood produced in a given operating period and reduce correspondingly the cost of the plywood. In view of the fact that each press is loaded and unloaded many times during an operating day, the reduction of the press time by even a fraction of a minute is of commercial significance.

4. *The ability to cure without the formation of blisters.*—As is well known, the formation of blisters occurs when the adhesive fails to form a strong bond between the veneers before the press is opened. When this occurs, the steam generated during the pressing operation blows the panels apart upon opening of the press, forming blisters or separating the plies entirely. Blister formation is greatly influenced by the water content of the adhesive and of the wood veneers. If too much water is present, the curing of the adhesive is retarded correspondingly so that the bond has not yet been formed when the press time has elapsed. Then, as explained above, upon opening the press, the plies separate and blisters are formed.

5. *Spreadability.*—This factor is not susceptible to numerical evaluation. However, if the consistency or other properties of the adhesive are not such that it may be spread rapidly and evenly upon the core veneers using the conventional spreaders, the final bond will be correspondingly weak. The precise control of the spreadability of the adhesive which is necessary for its proper application will be apparent from the fact that the adhesive layer as applied is only about 0.005 inch thick. Hence it is very difficult to formulate a composition which will spread uniformly in such a thin layer over the veneer surfaces encountered in ordinary plywood operation, particularly since these vary greatly in roughness and surface texture.

6. *Extendability with water and with the conventional solid fillers.*—The synthetic resins as a class are expensive, and any economy which may be achieved by reducing the amount of resin in an adhesive formulation by the incorporation of an extender without adversely affecting the adhesive is reflected in reduced cost of the plywood product.

7. *Long pot life, by which is meant the useful life of the adhesive mixture after its formulation.*—It is advantageous to be able to mix the adhesive composition a considerable period of time before it is to be used. Hence the constituents of the adhesive should be of such a character that they do not separate in the spreader, react chemically with each other in any harmful way, or otherwise become unsuited for use prior to their application.

It will be apparent that a very delicate balance between the above factors exists for any given adhesive formulation, and that variations in the formulation in an effort to improve one or the other of its properties may disturb the balance and unfavorably affect others of its properties. For example, the tolerance of the adhesive to long assembly times may be increased by incorporating synthetic resins having a relatively low degree of advancement. Use of such a resin, however, increases the press time since a relatively long period of time is required for its cure.

Conversely, the press time may be reduced by use of a more advanced resin, but this, because of the decreased thermoplasticity of the highly advanced resins, adversely affects the transfer properties of the adhesives and therefore has the disadvantageous effect of reducing their tolerance to long assembly times.

Similarly the transfer qualities of the adhesive may be improved by extending them with water, or by using a less advanced resin. However, the use of increased amounts of water decreases the viscosity of the adhesive and increases its tendency to form blisters, while use of the less advanced resins increases the press time required to set the adhesive.

Furthermore, attempts to reduce the cost of the adhesive by the use of solid fillers are limited by the fact that, when an excessive amount of solid filler is employed, it tends to separate and to interfere with the spreadability of the adhesive composition. Also, attempts to affect favorably any of the above variables frequently reduces the pot life of the adhesive and thereby seriously impairs its applicability in the usual plywood fabricating operations. It will be obvious, therefore, that any expedient by means of which one or more of the above factors may be influenced favorably without unfavorably affecting others of the factors, represents a significant achievement in the advancement of the plywood art.

While investigating the effect of various substances upon the properties of thermosetting plywood adhesives, I have made the unexpected discovery that the alkali-dispersible cellulose ethers as a class, and methyl cellulose in particular, when introduced into the phenol-aldehyde resinous plywood adhesives increase the assembly time tolerance of these adhesives to a remarkable degree. This desirable result is accomplished without increasing the press time, or adversely affecting the other properties of the adhesives. In fact, incorporation of the cellulose ethers materially improves their properties in several respects. It greatly increases their ability to hold in suspension walnut shell flour and other solid fillers, and thus reduces the cost of the glue line without separation of the filler and consequent reduction in pot life. It also imparts an improved working consistency to the adhesive mixtures. They spread readily on veneers to which they are applied, and once spread they tend to remain on the surface of the veneer rather than to sink into the wood. In the press, after the superimposition of the face veneers, they transfer readily to the latter so that an effective bond is formed on hot pressing.

Broadly stated, the modified phenol-aldehyde thermosetting resinous adhesive compositions of my invention comprise an aqueous dispersion of a phenol-aldehyde resin, an alkali-dispersible cellulose ether, and suitable proportions of alkali, solid fillers and other materials. A preferred range of proportions of these constitutents, and a specific formulation are given in Table I, wherein parts are expressed as parts by weight.

Table I

|  | Preferred Range | Specific Formulation |
| --- | --- | --- |
| Phenol-aldehyde Resin (solids basis) | 200 | 200 |
| Cellulose ether (solids basis) | 0.1–10.0 | 0.6 |
| Solid filler (e.g. Walnut shell flour) | 20–200 | 80 |
| Water | 200–1000 | 400 |
| Alkali | (1) | (1) |

1 Solubilizing quantity.

The phenol-aldehyde resins as a class are broadly suitable for the purposes of the present invention. Included, therefore, are the resinous condensation products of the aldehydes with phenol, the cresols, resorcinol, the xylenols, and the higher phenols. Also included are the resinous condensation products of the phenols with aldehydes other than formaldehyde, examples being acetaldehyde, furfural, the substituted furfurals, and the like. Also comprehended are the interpolymers of these materials and mixtures of the polymerized materials.

Although the phenol-aldehyde resins may be employed in the solid state, as by dissolving or dispersing them in alkaline solution, it is preferred to employ the alkaline dispersions thereof which are commercially available, usually as dispersions containing about 40% by weight of phenol aldehyde resin and having a pH of about 11 to 12. In either case, the degree of polymerization or advancement of the resin should be such as to be suited for the press times and other operational variables contemplated.

The cellulose ethers which are suitable for the purpose of the present invention are, in general, those which are dispersible in aqueous alkaline media and which therefore are compatible with water base phenolic adhesives. They include, for example, methyl cellulose, methyl propyl cellulose, methyl ethyl cellulose, and the like. These materials as a class may be prepared by treating purified cotton or wood cellulose with a strong alkali such as caustic soda to form alkali cellulose. The latter then is reacted at high temperatures under pressure with an alkyl halide. Methyl cellulose, for example, is made by treating cellulose with caustic soda, and reacting the resulting alkali cellulose with methyl chloride under elevated temperatures and pressures. This forms an etherified product containing approximately two methyl groups per anhydroglucose residue in the cellulose chain. The methoxyl content of the product varies from 29 to 32%.

Methyl cellulose is a preferred cellulose ether for use in the preparation of the adhesive compositions described herein. It is available commercially in viscosity types ranging from 10 to 4000 centipoises, these values being the viscosities of 2% by weight aqueous solutions at 20° C.

I have found further that the concentration of the cellulose ether dispersion employed has a profound influence on its effectiveness in imparting the foregoing qualities to the adhesive compositions in which it is contained. In general, as the concentration of the dispersion increases, its effectiveness decreases rapidly, so that a cellulose ether dispersion of medium concentration must be used in quantities many times as large as one of lower concentration to produce the same result. As is shown more particularly in the examples below, one part of methyl cellulose of a given viscosity type in a 1% by weight aqueous solution is at least 15 times as effective in increasing the viscosity of a phenolic adhesive composition, as the same amount of a 5% solution of the same viscosity type in an adhesive formulation which otherwise is just the same. Hence for the purposes of the present invention it is preferred to employ the cellulose ether of the higher viscosity types in relatively dilute aqueous solutions, i. e. in solutions containing from about 0.5% to about 4.0% by weight cellulose ether.

Other materials which are admixed with the phenolaldehyde resin and the alkali-dispersible cellulose ether in formulating my hereindescribed adhesive compositions include an alkaline material, water, and solid fillers. The alkaline material serves to dissolve the phenolic resin, to promote the dispersion of the solid filler in the mixture and form a blend of uniform composition, and to catalyze the setting of the resin to form the final bond. Suitable alkaline materials comprise particularly the basic-acting compounds of the alkali metals, for example the alkali metal hydroxides, mixtures thereof, and substances such as sodium carbonate which in alkaline solution hydrolyze to form an alkali metal hydroxide. These are used in amount sufficient to accomplish the above purposes, this amount being defined herein as being a "solubilizing quantity," since in general an amount of alkaline material which is sufficient to dissolve the phenolic resin and form a uniform blend will be sufficient also to catalyze the reaction. Where commercial alkaline, water base phenolic resins having a pH of from about pH 11 to about pH 12 are employed, it usually is not necessary to add a further quantity of alkali. However, with certain compositions, particularly those which are highly extended with solid fillers, additional amounts of alkaline material may be added as required to provide a uniform blend of desired setting qualities.

In addition, solid fillers such as walnut shell flour, wood flour, clay etc. may be added in the amount calculated to secure the desired extension of the phenolic resin. Water may be added as necessary to produce a spreading viscosity and to secure further extension of the resin, not enough being added, however, to induce the formation of blisters during pressing.

In the accompanying drawings:

Fig. 1 is a flow diagram of applicant's preferred method;

Fig. 2 is a cross-sectional view of the plywood product made by applicant's preferred method.

The hereindescribed adhesive compositions may be formulated from the foregoing constituents by introducing them in the predetermined amounts into a mixer or other vessel provided with suitable agitating means. They then are stirred or mixed, preferably at room temperature, until a blend of uniform composition and consistency is obtained. It is noteworthy that the product formed upon mixing the phenol-aldehyde resin and the cellulose ether has a viscosity which is substantially higher than the viscosity of either the phenol-aldehyde resin or of the cellulose ether solution employed. This indicates that a physical or chemical combination, or both, occurs between these constituents.

The foregoing conclusion is fortified by the fact that the order of mixing the constituents is of great importance in determining the suitability of the resulting composition for the purposes of the present invention. I have discovered that to secure the full effect of the action between the phenol-aldehyde resin and the cellulose ether, it is necessary to admix these two materials in the absence of excess alkali, by which is meant in the absence of more alkali than is necessary to maintain the phenol-aldehyde resin in solution and catalyze the reaction. Such is the case, for example, when a commercial water base phenolic resin having a pH of from about pH 11 to about pH 12 is employed. If more than this amount of alkali is necessary or desirable, as is often the case where large amounts of solid fillers are to be incorporated in the mixture, the additional alkali should not be added directly to the cellulose ether. If this is done, as where (1) the alkali is mixed with the cellulose ether prior to the addition of the phenol-aldehyde resin, or (2) the three materials are added together and mixed simultaneously, or (3) it is attempted to formulate the composition directly from the ultimate raw materials (i. e. by polymerizing the phenol and the aldehyde in the presence of the cellulose ether and a substantial amount of an alkaline material), the alkaline material apparently reacts preferentially with the cellulose ether, destroying its advantageous properties insofar as the purposes of the present invention are concerned. However, if the reacted phenol-aldehyde resin is admixed with the cellulose ether prior to the addition of further quantities of alkaline material, the resin appears to act as a buffer, tying up the cellulose ether so that an alkaline material may subsequently be added in substantial amount as required to produce the desired blending effect, without interfering with the desired combination of cellulose ether and phenol-aldehyde resin.

I have discovered further that the viscosity of the final adhesive composition is significantly influenced not only by the viscosity type of the cellulose ether used and the concentration of the cellulose ether dispersion, but also by the manner in which this dispersion is diluted with water in order to produce a dispersion of the desired concentration. Thus if an aqueous cellulose ether dispersion of a given concentration is to be incorporated in an adhesive formulation in which additional quantities of water are to be added to extend the mixture, or to increase its spreadability, mixing the cellulose ether dispersion with the phenolic resin, followed by the addition of the additional water, produces a final composition having the properties expected of one containing a cellulose ether dispersion of the given concentration. However, if the water is added to the cellulose ether prior to mixing the latter with the phenolic resin, the final composition has the properties expected of one formulated from a cellulose ether dispersion having a greater degree of dilution than possessed by the dispersion employed. In other words, if a cellulose ether dispersion having a concentration of 2% by weight is mixed with the phenol-aldehyde resin, and then an equal weight of water is incorporated in the mixture, the final composition has the properties expected of one made from a cellulose ether composition having a 2% by weight concentration. If, however, the 2% by weight cellulose ether dispersion and the equal weight of water are mixed together and the phenolic resin then added, the resulting composition has the characteristics expected of one made not from a 2% cellulose ether dispersion but from a 1% by weight cellulose ether dispersion. This also argues in favor of a reaction occurring between the phenol-aldehyde resin and the cellulose ether. The reaction product once formed apparently is not disturbed by the addition of further quantities of water (or of alkali as noted above). However, if the water (or alkali) is added prior to the formation of the reaction product, then the reaction between the resin and the cellulose ether is affected thereby, so that a final composition of the expected properties is not formed.

The adhesive compositions of the present invention are illustrated by the following examples, wherein parts are given in parts by weight.

EXAMPLE 1

This example illustrates a preferred composition of the present invention, and a method for its preparation and use.

500 parts of phenol-formaldehyde resin in aqueous alkaline dispersion having a solids content of about 40% by weight and a pH of about 11.5 was placed in a mixer together with 80 parts walnut shell flour. These two constituents were stirred vigorously for three minutes. 60 parts aqueous methyl cellulose ("Methocel") solution having a methyl cellulose content of 1% by weight (4,000 centipoises viscosity grade) then was added and the mixing continued for another minute. Next 40 parts water was introduced into the mixer and the entire composition stirred until it was of uniform consistency. It then was ready for use.

A quantity of the composition prepared as indicated in the above paragraph was applied to the production of three-ply Douglas fir plywood panels in customary manner, by using assembly periods of from 3 to 30 minutes. Satisfactory bonding at normal press times was obtained even with the higher assembly periods, and the panels produced conformed to exterior grade specifications.

EXAMPLE 2

This example illustrates the high degree of extension possible using the modified phenolic adhesives of the present invention.

50 parts water, 200 parts of a 1% aqueous solution of methyl cellulose having a viscosity of 4,000 centipoises, and 125 parts walnut shell flour were placed in a mixer and vigorously mixed until the walnut shell flour particles were thoroughly wetted. To the resulting mixture was added 200 parts phenol-formaldehyde resin having a solids content of about 40% by weight and a pH of about 11.5. The composition again was mixed thoroughly. Then 30 parts caustic soda was added, followed by another mixing period. Next, to the resulting mixture was added 300 parts phenol-formaldehyde resin together with 30 parts clay. The resulting mixture then was mixed to uniform consistency.

The extended resin prepared as set forth above was applied to the fabrication of plywood panels, using an assembly time of 3 to 30 minutes. The panels produced in this manner showed good bonding and conformed to exterior grade plywood requirements.

As a control, the above composition was formulated omitting the methyl cellulose. In this composition, it was impossible to spread the composition satisfactorily, or to keep the walnut shell flour and clay filler suspended in the aqueous medium.

EXAMPLE 3

This example illustrates the application of methyl propyl cellulose ("Propocel") in the formulation of the hereindescribed compositions. A plywood adhesive was formed by thoroughly mixing the following constituents:

| | Parts by weight |
|---|---|
| Phenol-formaldehyde resin (40% solids) | 500 |
| Methyl-propyl cellulose (1% solution) | 60 |
| Walnut shell flour | 80 |
| Water | 40 |

The resulting composition was used satisfactorily in making plywood panels, under conditions substantially as set forth in Example 1.

The following examples illustrate the effect of varying the concentration of the cellulose ether dispersion on the viscosity of the final compositions. In all cases the compositions were prepared by diluting a 5% by weight dispersion of methyl cellulose of the 4000 centipoise viscosity type with sufficient water to make a dispersion of the desired concentration. This then was mixed with the indicated amount of phenol-formaldehyde resin (40% by weight solids; pH of about 11.5) and walnut shell flour filler. After thorough mixing of these constituents, additional water as necessary was added to make the total volume of the composition the same as that of the other formulations in this group of examples. The resulting mixture then was thoroughly stirred, and its viscosity measured after standing for approximately one hour at room temperature. The results are given in Table II, the amounts of the constituents being given in parts by weight, except where otherwise indicated.

*Table II.—Methyl cellulose dispersion*

| Example Number | Phenolic Resin | Walnut Shell Flour | Methyl Cellulose Content (per cent by wt.) | Methyl Cellulose Content (Parts) | Water | Added Water | Viscosity (poises) |
|---|---|---|---|---|---|---|---|
| 4 | 500 | 80 | 1 | 1 | 100 | ------- | 48.1 |
| 5 | 500 | 80 | 1 | 1 | 100 | ------- | 49 |
| 6 | 500 | 80 | 2 | 1 | 50 | 50 | 9.8 |
| 7 | 500 | 80 | 2 | 1.25 | 62.5 | 37.5 | 21.1 |
| 8 | 500 | 80 | 2 | 1.5 | 75 | 25 | 59 |
| 9 | 500 | 80 | 2 | 1.75 | 87.5 | 12.5 | 88 |
| 10 | 500 | 80 | 5 | 1 | 20 | 80 | 2.85 |
| 11 | 500 | 80 | 5 | 2 | 40 | 60 | 3.8 |
| 12 | 500 | 80 | 5 | 3 | 60 | 40 | 4.5 |
| 13 | 500 | 80 | 5 | 4 | 80 | 20 | 5.6 |

In a manner similar to that set forth in Example 1, there are prepared adhesive compositions illustrative of the present invention and containing in place of the phenol-formaldehyde resin of that example; a cresol formaldehyde resin, a resorcinol-formaldehyde resin, or a phenol-furfural resin.

From an analysis of the results of the foregoing examples, it is apparent that, by the present invention, there is afforded a range of modified phenol-aldehyde plywood adhesives the use of which is advantageous in several respects over the phenol-aldehyde resins of the prior art. The hereindescribed resins have remarkably high tolerance to increased assembly times, thus allowing increased latitude in assembling the panels in the plywood mills, and permitting the use of multipanel presses having a capacity not heretofore possible. Such increase in assembly time tolerance is obtained without any reduction in press time. Also, the adhesives may be extended to an unusual degree with water and with solid fillers while still retaining the ability of the composition to retain the required spreading consistency and, as evidenced by the adequate bonding secured, the required degree of transfer during the pressing operation. These advantages are obtained, furthermore, without sacrificing any of the qualities requisite to the formulation of an adhesive for use in the hot press manufacture of exterior grade plywood.

Having now described my invention in preferred embodiments, I claim as new and desire to protect by Letters Patent:

1. The process of making a plywood adhesive which comprises forming a mixture of an aqueous alkaline solution of a thermosetting, resinous condensation product of a phenol and formaldehyde and an aqueous dispersion of an alkali-dispersible cellulose ether, the said dispersion containing from about 0.5% to about 4.0% by weight of cellulose ether, the mixture containing from about 0.1 part to about 10.0 parts by weight cellulose ether (solids basis) for each 200 parts by weight phenol-formaldehyde resin (solids basis).

2. The plywood product the plies of which have been glued together with an adhesive composition comprising a mixture of an aqueous alkaline solution of a thermosetting, resinous condensation product of a phenol and formaldehyde, and an aqueous dispersion of an alkali dispersible cellulose ether, the said dispersion containing from about 0.5% to about 4.0% by weight cellulose ether, the said mixture containing from about 0.1 part to about 10.0 parts by weight cellulose ether (solids basis) for each 200 parts by weight phenol-formaldehyde resin (solids basis).

3. The process of making an adhesive composition which comprises forming a mixture of an aqueous alkaline solution of a thermosetting, resinous condensation product of a phenol and an aldehyde and an aqueous dispersion of an alkali dispersible cellulose ether, the said dispersion containing from about 0.5% to about 4.0% by weight cellulose ether, the mixture containing from about 0.1 part to about 10.0 parts by weight cellulose ether (solids basis) for each 200 parts by weight phenol aldehyde resin (solids basis).

4. The plywood product the plies of which have been glued together with an adhesive composition comprising a mixture of an aqueous alkaline solution of a thermosetting, resinous condensation product of a phenol and an aldehyde, and an aqueous dispersion of an alkali dispersible cellulose ether, the said dispersion containing from about 0.5% to about 4.0% by weight cellulose ether, and the said mixture containing from about 0.1 part to about 10.0 parts by weight cellulose ether (solids basis) for each 200 parts by weight phenol-aldehyde resin (solids basis).

5. The process of making an adhesive composition which comprises forming a mixture of an aqueous alkaline solution of a thermosetting, resinous condensation product of cresol and an aldehyde and an aqueous dispersion of an alkali dispersible cellulose ether, the said dispersion containing from about 0.5% to about 4.0% by weight cellulose ether, the mixture containing from about 0.1 part to about 10.0 parts by weight cellulose ether (solids basis) for each 200 parts by weight cresol-aldehyde resin (solids basis).

6. The plywood product the plies of which have been glued together with an adhesive composition comprising a mixture of an aqueous alkaline solution of a thermosetting, resinous condensation product of cresol and an aldehyde, and an aqueous dispersion of an alkali dispersible cellulose ether, the said dispersion containing from about 0.5% to about 4.0% by weight cellulose ether, and the said mixture containing from about 0.1 part to about 10.0 parts by weight cellulose ether (solids basis) for each 200 parts by weight cresol-aldehyde resin (solids basis).

7. The process of making an adhesive composition which comprises forming a mixture of an aqueous alkaline solution of a thermosetting, resinous condensation product of resorcinol and an aldehyde and an aqueous dispersion of an alkali dispersible cellulose ether, the said dispersion containing from about 0.5% to about 4.0% by weight cellulose ether, the mixture containing from about 0.1 part to about 10.0 parts by weight cellulose ether (solids basis) for each 200 parts by weight resorcinol-aldehyde resin (solids basis).

8. The plywood product the plies of which have been glued together with an adhesive composition comprising a mixture of an aqueous alkaline solution of a thermosetting, resinous condensation product of resorcinol and an aldehyde, and an aqueous dispersion of an alkali dispersible cellulose ether, the said dispersion containing from about 0.5% to about 4.0% by weight cellulose ether, and the said mixture containing from about 0.1 part to about 10.0 parts by weight cellulose ether (solids basis) for each 200 parts by weight resorcinol-aldehyde resin (solids basis).

9. The process of making an adhesive composition which comprises forming a mixture of an aqueous alkaline solution of a thermosetting, resinous condensation product of phenol and formaldehyde and an aqueous dispersion of an alkali dispersible cellulose ether, the said dispersion containing from about 0.5% to about 4.0% by weight cellulose ether, the mixture containing from about 0.1 part to about 10.0 parts by weight cellulose ether (solids basis) for each 200 parts by weight phenol-formaldehyde resin (solids basis).

10. The plywood product the plies of which have been glued together with an adhesive composition comprising a mixture of an aqueous alkaline solution of a thermosetting, resinous condensation product of phenol and formaldehyde, and an aqueous dispersion of an alkali dispersible cellulose ether, the said dispersion containing from about 0.5% to about 4.0% by weight cellulose ether, and the said mixture containing from about 0.1 part to about 10.0 parts by weight cellulose ether (solids basis) for each 200 parts by weight phenol-formaldehyde resin (solids basis).

11. The process of making an adhesive composition which comprises forming a mixture of an aqueous alkaline solution of a thermosetting, resinous condensation product of cresol and formaldehyde and an aqueous dispersion of an alkali dispersible cellulose ether, the said dispersion containing from about 0.5% to about 4.0% by weight cellulose ether, the mixture containing from about 0.1 part to about 10.0 parts by weight cellulose ether (solids basis) for each 200 parts by weight cresol-formaldehyde resin (solids basis).

12. The plywood product the plies of which have been glued together with an adhesive composition comprising a mixture of an aqueous alkaline solution of a thermosetting, resinous condensation product of cresol and formaldehyde, and an aqueous dispersion of an alkali dispersible cellulose ether, the said dispersion containing from about 0.5% to about 4.0% by weight cellulose ether, and the said mixture containing from about 0.1 part to about 10.0 parts by weight cellulose ether (solids basis) for each 200 parts by weight cresol-formaldehyde resin (solids basis).

13. The process of making an adhesive composition which comprises forming a mixture of an aqueous alkaline solution of a thermosetting, resinous condensation product of resorcinol and formaldehyde and an aqueous dispersion of an alkali dispersible cellulose ether, the said dispersion containing from about 0.5% to about 4.0% by weight cellulose ether, the mixture containing from about 0.1 part to about 10.0 parts by weight cellulose ether (solids basis) for each 200 parts by weight resorcinol-formaldehyde resin (solids basis).

14. The plywood product the plies of which have been glued together with an adhesive composition comprising a mixture of an aqueous alkaline solution of a thermosetting, resinous condensation product of resorcinol and formaldehyde, and an aqueous dispersion of an alkali dispersible cellulose ether, the said dispersion containing from about 0.5% to about 4.0% by weight cellulose ether, and the said mixture containing from about 0.1 part to about 10.0 parts by weight cellulose ether (solids basis) for each 200 parts by weight resorcinol-formaldehyde resin (solids basis).

15. The process of making an adhesive composition which comprises forming a mixture of an aqueous alkaline solution of a thermosetting, resinous condensation product of a phenol and formaldehyde and an aqueous dispersion of methyl cellulose, the said dispersion containing from about 0.5% to about 4.0% by weight methyl cellulose, the mixture containing from about 0.1 part to about 10.0 parts by weight methyl cellulose (solids basis) for each 200 parts by weight phenol-formaldehyde resin (solids basis).

16. The plywood product the plies of which have been glued together with an adhesive composition comprising a mixture of an aqueous alkaline solution of a thermosetting, resinous condensation product of a phenol and formaldehyde, and an aqueous dispersion of methyl cellulose, the said dispersion containing from about 0.5% to about 4.0% by weight methyl cellulose, and the said mixture containing from about 0.1 part to about 10.0 parts by weight methyl cellulose (solids basis) for each 200 parts by weight phenol-formaldehyde resin (solids basis).

17. The process of making an adhesive composition which comprises forming a mixture of an aqueous alkaline solution of a thermosetting, resinous condensation product of phenol and formaldehyde and an aqueous dispersion of methly cellulose, the said dispersion containing from about 0.5% to about 4.0% by weight methyl cellulose, the mixture containing from about 0.1 part to about 10.0 parts by weight methyl cellulose (solids basis) for each 200 parts by weight phenol-formaldehyde resin (solids basis).

18. The plywood product the plies of which have been glued together with glued together with an adhesive composition comprising a mixture of an aqueous alkaline solution of a thermosetting, resinous condensation product of phenol and formaldehyde, and an aqueous dispersion of methyl cellulose, the said dispersion containing from about 0.5% to about 4.0% by weight methyl cellulose, and the said mixture containing from about 0.1 part to about 10.0 parts by weight methyl cellulose (solids basis) for each 200 parts by weight phenol-formaldehyde resin (solids basis).

19. The proceess of making an adhesive composition which comprises forming a mixture of an aqueous alkaline solution of a thermosetting, resinous condensation product of cresol and formaldehyde and an aqueous dispersion of methyl cellulose, the said dispersion containing from about 0.5% to about 4.0% by weight methyl cellulose, the mixture containing from about 0.1 part to about 10.0 parts by weight methyl cellulose (solids basis) for each 200 parts by weight cresol-formaldehyde resin (solids basis).

20. The plywood product the plies of which have been glued together with an adhesive composition comprising a mixture of an aqueous alkaline solution of a thermosetting, resinous condensation product of cresol and formaldehyde, and an aqueous dispersion of methyl cellulose, the said dispersion containing from about 0.5% to about 4.0% by weight methyl cellulose, and the said mixture containing from about 0.1 part to about 10.0 parts by weight methyl cellulose (solids basis) for each 200 parts by weight cresol-formaldehyde resin (solids basis).

21. The process of making an adhesive composition which comprises forming a mixture of an aqueous alkaline solution of a thermosetting, resinous condensation product of resorcinol and formaldehyde and an aqueous dispersion of methyl cellulose, the said dispersion containing from about 0.5% to about 4.0% by weight methyl cellulose, the mixture containing from about 0.1 part to about 10.0 parts by weight methyl cellulose (solids basis) for each 200 parts by weight resorcinol-formaldehyde resin (solids basis).

22. The plywood product the plies of which have been glued together with an adhesive composition comprising a mixture of an aqueous alkaline solution of a thermosetting, resinous condensation product of resorcinol and formaldehyde, and an aqueous dispersion of methyl cellulose, the said dispersion containing from about 0.5% to about 4.0% by weight methyl cellulose, and the said mixture containing from about 0.1 part to about 10.0 parts by weight methyl cellulose (solids basis) for each 200 parts by weight resorcinol-formaldehyde resin (solids basis).

23. The process of making an adhesive composition which comprises forming a mixture of an aqueous alkaline solution of a thermosetting, resinous condensation product of a phenol and an aldehyde and an aqueous dispersion of methyl cellulose, the said dispersion containing from about 0.5% to about 4.0% by weight methyl cellulose, the mixture containing from about 0.1 part to about 10.0 parts by weight methyl cellulose (solids basis) for each 200 parts by weight phenol-aldehyde resin (solids basis).

24. The plywood product the plies of which have been glued together with an adhesive composition comprising a mixture of an aqueous alkaline solution of a thermosetting, resinous condensation product of a phenol and an aldehyde, and an aqueous dispersion of methyl cellulose, the said dispersion containing from about 0.5% to about 4.0% by weight methyl cellulose, and the said mixture containing from about 0.1 part to about 10.0 parts by weight methyl cellulose (solids basis) for each 200 parts by weight phenol-aldehyde resin (solids basis).

25. The process of making an adhesive composition which comprises forming a mixture of an aqueous alkaline solution of a thermosetting, resinous condensation product of phenol and an aldehyde and an aqueous dispersion of methyl cellulose, the said dispersion containing from about 0.5% to about 4.0% by weight methyl cellulose, the mixture containing from about 0.1 part to about 10.0 parts by weight methyl cellulose (solids basis) for each 200 parts by weight phenol-aldehyde resin (solids basis).

26. The plywood product the plies of which have been glued together with an adhesive composition comprising a mixture of an aqueous alkaline solution of a thermosetting, resinous condensation product of phenol and an aldehyde, and an aqueous dispersion of methyl cellulose, the said dispersion containing from about 0.5% to about 4.0% by weight methyl cellulose, and the said mixture containing from about 0.1 part to about 10.0 parts by weight methyl cellulose (solids basis) for each 200 parts by weight phenol-aldehyde resin (solids basis).

27. The process of making an adhesive composition which comprises forming a mixture of an aqueous alkaline solution of a thermosetting, resinous condensation product of cresol and an aldehyde and an aqueous dispersion of methyl cellulose, the said dispersion containing from about 0.5% to about 4.0% by weight methyl cellulose, the mixture containing from about 0.1 part to about 10.0 parts by weight methyl cellulose (solids basis) for each 200 parts by weight cresol-aldehyde resin (solids basis).

28. The plywood product the plies of which have been glued together with an adhesive composition comprising a mixture of an aqueous alkaline solution of a thermosetting, resinous condensation product of cresol and an aldehyde, and an aqueous dispersion of methyl cellulose, the said dispersion containing from about 0.5% to about 4.0% by weight methyl cellulose, and the said mixture containing from about 0.1 part to about 10.0 parts by weight methyl cellulose (solids basis) for each 200 parts by weight cresol-aldehyde resin (solids basis).

29. The process of making an adhesive composition which comprises forming a mixture of an aqueous alkaline solution of a thermosetting, resinous condensation product of resorcinol and an aldehyde and an aqueous dispersion of methyl cellulose, the said dispersion containing from about 0.5% to about 4.0% by weight methyl cellulose, the mixture containing from about 0.1 part to about 10.0 parts by weight methyl cellulose (solids basis) for each 200 parts by weight resorcinol-aldehyde resin (solids basis).

30. The plywood product the plies of which have been glued together with an adhesive composition comprising a mixture of an aqueous alkaline solution of a thermosetting, resinous condensation product of resorcinol and an aldehyde, and an aqueous dispersion of methyl cellulose, the said dispersion containing from about 0.5% to about 4.0% by weight methyl cellulose, and the said mixture containing from about 0.1 part to about 10.0 parts by weight methyl cellulose (solids basis) for each 200 parts by weight resorcinol-aldehyde resin (solids basis).

31. The process of making an adhesive composition which comprises forming a mixture comprising an aqueous alkaline solution of a thermosetting, resinous condensation product of phenol and an aldehyde and an aqueous dispersion of an alkali dispersible cellulose ether, the said dispersion containing from about 0.5% to about 4.0% by weight cellulose ether, and a solid filler, the mixture having substantially the following composition expressed in parts by weight:

| | |
|---|---|
| Phenol-aldehyde resin (solids basis) | 200 |
| Cellulose ether (solids basis) | 0.1–10.0 |
| Solid filler | 20–200 |
| Water | 200–1000 |
| Alkali | Solubilizing amount |

CHARLES N. CONE.

REFERENCES CITED

The following references are of record in the file of this patent:

UNITED STATES PATENTS

| Number | Name | Date |
|---|---|---|
| 1,019,408 | Baekeland et al. | Mar. 5, 1912 |
| 2,276,519 | Sherk et al. | Mar. 17, 1942 |
| 2,462,253 | Booty | Feb. 22, 1949 |
| 2,474,292 | Weidner et al. | June 28, 1949 |
| 2,526,728 | Burk et al. | Oct. 24, 1950 |
| 2,527,400 | Cooper | Oct. 24, 1950 |
| 2,565,251 | Malmstrom | Aug. 21, 1951 |
| 2,574,784 | Heritage | Nov. 13, 1951 |